(12) United States Patent
Sujandi et al.

(10) Patent No.: US 10,590,010 B2
(45) Date of Patent: Mar. 17, 2020

(54) PROCESSES FOR THE SEPARATION OF WATER FROM AQUEOUS SYSTEMS

(71) Applicant: SOLENIS TECHNOLOGIES, L.P., Wilmington, DE (US)

(72) Inventors: Sujandi Sujandi, Singapore (SG); Sophie Maitro-Vogel, Mannheim (DE); Stephan Nied, Neustadt/Weinstr. (DE); Heike Glade, Bremen (DE)

(73) Assignee: SOLENIS TECHNOLOGIES, L.P., Wilmington, DE (US)

( * ) Notice: Subject to any disclaimer, the term of this patent is extended or adjusted under 35 U.S.C. 154(b) by 0 days.

(21) Appl. No.: 15/770,230

(22) PCT Filed: Oct. 27, 2016

(86) PCT No.: PCT/EP2016/075993
§ 371 (c)(1),
(2) Date: Apr. 23, 2018

(87) PCT Pub. No.: WO2017/076755
PCT Pub. Date: May 11, 2017

(65) Prior Publication Data
US 2018/0305223 A1    Oct. 25, 2018

(30) Foreign Application Priority Data
Nov. 6, 2015    (EP) .................................... 15193474

(51) Int. Cl.
*C02F 1/08*    (2006.01)
*B01D 1/04*    (2006.01)
(Continued)

(52) U.S. Cl.
CPC .................. *C02F 1/08* (2013.01); *B01D 1/04* (2013.01); *B01D 1/065* (2013.01); *B01D 1/16* (2013.01);
(Continued)

(58) Field of Classification Search
CPC ... C02F 1/042; C02F 1/08; B01D 1/04; B01D 1/065; B01D 1/16; B01D 1/26
See application file for complete search history.

(56) References Cited

U.S. PATENT DOCUMENTS

| 4,931,206 A | 6/1990 | McDonald et al. |
| 5,104,951 A * | 4/1992 | Seelmann-Eggebert ..................... C08F 220/04 526/240 |

(Continued)

FOREIGN PATENT DOCUMENTS

| DE | 43 25 237 A1 | 2/1995 |
| DE | 102 43 361 A1 | 4/2004 |

(Continued)

OTHER PUBLICATIONS

ESPACENET Translation of WO2013020937 Specification Obtained May 9, 2019 (Year: 2019).*

(Continued)

Primary Examiner — Jonathan Miller
(74) Attorney, Agent, or Firm — Lorenz & Kopf, LLP

(57) ABSTRACT

Processes for the separation of water from a mixture of water with other components, comprising the following steps: A) providing feed material FM comprising water and at least one a nonionic surfactant S in an amount of 0.1 to 1000 ppm by weight based on the feed material FM, B) subjecting said feed material FM to a distillation step using a falling film evaporator.

10 Claims, 6 Drawing Sheets

(51) Int. Cl.
*B01D 1/06* (2006.01)
*B01D 1/16* (2006.01)
*B01D 1/26* (2006.01)
*C02F 1/04* (2006.01)
C02F 1/54 (2006.01)
C02F 1/56 (2006.01)
C02F 5/10 (2006.01)

(52) U.S. Cl.
CPC ................ *B01D 1/26* (2013.01); *C02F 1/042* (2013.01); *C02F 1/547* (2013.01); *C02F 1/56* (2013.01); *C02F 5/10* (2013.01)

(56) References Cited

U.S. PATENT DOCUMENTS

| | | | | |
|---|---|---|---|---|
| 5,589,525 | A * | 12/1996 | Hunter | B01D 1/22 |
| | | | | 159/13.1 |
| 10,160,683 | B2 * | 12/2018 | Blumenschein | C02F 1/5236 |
| 2012/0125864 | A1 * | 5/2012 | Richardson | B01D 1/16 |
| | | | | 210/737 |
| 2013/0037491 | A1 * | 2/2013 | Detering | C02F 5/10 |
| | | | | 210/698 |
| 2013/0092523 | A1 * | 4/2013 | Levy | B01D 1/04 |
| | | | | 203/89 |
| 2013/0299334 | A1 * | 11/2013 | Carnelli | C02F 1/04 |
| | | | | 203/10 |
| 2016/0102006 | A1 * | 4/2016 | Blumenschein | C02F 1/5236 |
| | | | | 210/638 |

FOREIGN PATENT DOCUMENTS

| | | |
|---|---|---|
| DE | 10 2005 011 608 A1 | 9/2006 |
| EP | 0497611 A1 | 8/1992 |
| GB | 1 519 512 | 7/1978 |
| WO | WO 03/090531 A1 | 11/2003 |
| WO | WO 2005/037757 A1 | 4/2005 |
| WO | WO 2006/097435 A1 | 9/2006 |
| WO | WO 2013/020937 A1 | 2/2013 |

OTHER PUBLICATIONS

ESPACENET Translation of WO2013020937 Claims Obtained May 9, 2019 (Year: 2019).*
International Search Report dated Feb. 1, 2017, in PCT/EP2016/075993, filed Oct. 27, 2016.
Extended European Search Report dated Apr. 1, 2016 in Patent Application No. 15193474.2.

* cited by examiner

PROCESSES FOR THE SEPARATION OF WATER FROM AQUEOUS SYSTEMS

BACKGROUND OF THE INVENTION

The present invention is related to processes for the separation of water from a mixture of water with other components, comprising the following steps:
A) providing feed material FM comprising water and at least one a nonionic surfactant S in an amount of 0.1 to 1000 ppm by weight based on the feed material FM,
B) subjecting said feed material FM to a distillation step using a falling film evaporator.

The separation of water from aqueous mixtures or solutions is a process of utmost technical relevance.

In particular, thermal desalination of water is of enormous importance. Standard processes for the thermal desalination of water include multi effect distillation (MED) and multi-stage effect distillation (MSF). While these processes have been employed for a long time, these processes still require improvement with respect to their efficiency.

One embodiment of MED uses a horizontal tube falling film evaporator. The falling film evaporator with horizontal tube bundles exhibit relatively high heat transfer coefficients under clean surface condition. However, they are susceptible to heat transfer deterioration and scale formation accompanied by film breakdown.

One embodiment of MED uses a vertical tube falling film evaporator.

In one embodiment the feed material is supplied by spraying onto the evaporator tube bundles using nozzles. The supply of feed material must be enough to form water film that evenly wets the surface and flows in a stable manner over the tubes.

For a more energy efficient operation, it is preferable to operate the evaporator in a MED plant in the laminar flow regime. Thereunder, less amount of feed material is necessary to be distributed over the tubes or, in other words, laminar flow regime requires lower wetting rates. In the laminar flow regime, a high wetting rate will lead to an unwanted increase in the thickness of the falling water film due to too much water supply or water overfeeding which reduces the heat transfer coefficient and causes a waste of energy for pumping or flooding of the evaporator.

Therefore it is preferable to operate a MED plant in the laminar flow regime. However, at low wetting rate the tube surface is susceptible to the occurrence of dry patches due to feed material maldistribution. Dry patches on the heated tube surface transmit essentially no heat and thus reduce thermal performance of the evaporator. Moreover, scale formation preferably starts at the edges of the dry patches where high local solution concentrations occur in the very thin film.

In industrial practice it is known that all heated tubes have to be maintained in a fully wetted state, that dry patches should be avoided and that the wetting rate has an influence on scale formation.

One limiting factor on the efficiency of thermal desalination processes used today, like in many other aqueous processes, is the formation of scale.

Another factor is to ensure that the falling film is not interrupted.

BRIEF SUMMARY OF THE INVENTION

The objective of the present invention was to provide processes for the separation of water from aqueous systems, especially for the thermal desalination of water, with a high efficiency and reduced formation of scale.

This objective has been achieved through processes according to claim 1.

DETAILED DESCRIPTION OF THE INVENTION

Figure 1:
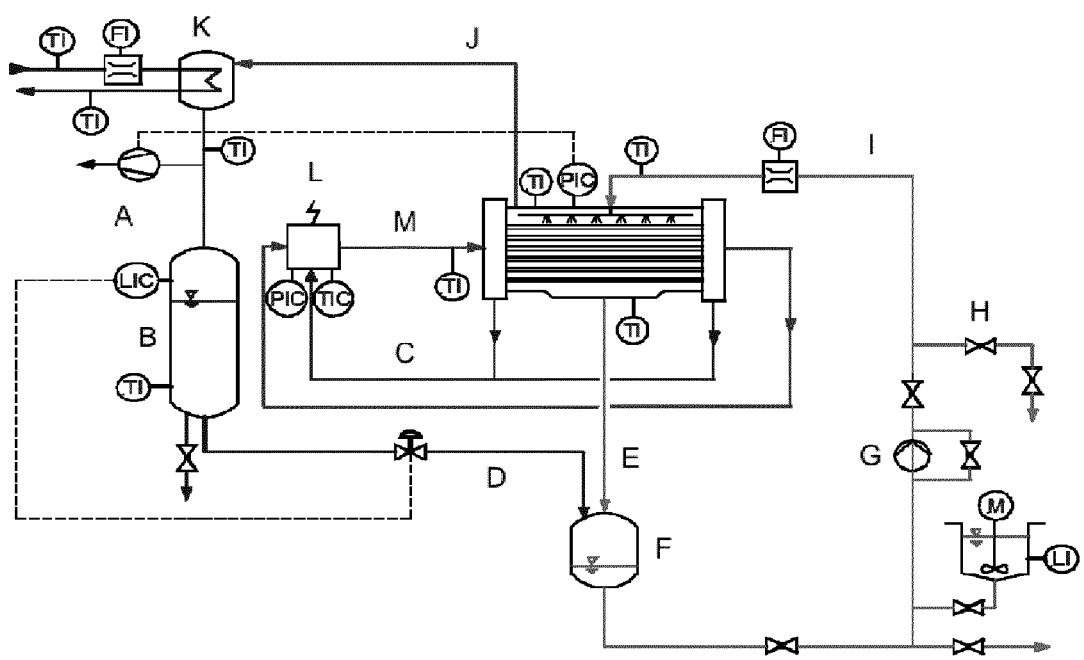
FIG. 1, depicts the schematic diagram of a pilot plant scale test rig.

Processes according to the invention are processes in which water is separated from an aqueous system, for example an aqueous solution or an aqueous mixture.

Processes according to the invention are for example suitable for removing water from solutions of sugar. Such processes are for example of relevance in food processing. In the latter case, the targeted product is not the water removed from the solution but rather the concentrated solution.

Processes according to the invention are further suitable for concentrating the brine obtained in waste water treatment operations. Examples of waste water treatment operations in which brine is subjected to concentration include plant discharge compliance, cooling tower blowdown, flue gas desulphurization waste water, coal to chemicals waste water, integrated coal gasification combined cycle waste water.

Processes according to the inventions are especially suitable for the thermal desalination of salt containing water like sea water or brackish water.

Processes according to the invention are further suitable for industrial process water and waste water treatment, waste water reuse and produced water treatment (e.g. for non-conventional oil and gas extraction). Industrial process water includes for example boiler feed water, heating and cooling water, process steam generation, water for petrochemical and refining, water for conventional oil and gas extraction, water for power generation, water for mining. Waste water reuse and produced water treatment processes include for example steam assisted gravity drainage produced water, fracking flowback and produced water, cooling tower blowdown, boiler blowdown, flue gas desulphurization waste water, integrated coal gasification combine cycle waste water and refinery effluent.

Desalination is a process that produces fresh water that is more suitable for human consumption or irrigation than the raw water by removing minerals like salts or other minerals from such raw water.

Thermal desalination uses distillation steps to evaporate water from the raw water. This is usually carried out as vacuum distillation under conditions of reduced pressure (below atmospheric pressure) and elevated temperature above room temperature.

In another embodiment, processes according to the invention are used for removing water from aqueous solutions or mixtures obtained in industrial processes or wastewater treatment, thus increasing the concentration of salts or other components in the brine.

Processes according to the invention are preferably being applied in MED processes.

In MED processes the feed material FM (for processes in which the water distilled off is the targeted product also referred as "raw water" RW) is subjected to an evaporation of water, thus distilling off pure water from the residual concentrate or brine. This corresponds to step B) of the present invention.

MED uses of multiple stages or "effects". In each stage the feed material (also referred to as feed water) is heated by steam in tubes. Some of the water evaporates, and this steam flows into the tubes of the next stage, heating and evaporating more water from the raw water. Each stage essentially reuses the energy from the previous stage.

In a preferred embodiment for carrying out the invention the feed material FM is sprayed on the top of a bank of horizontal tubes, and then drips from tube to tube until it is collected at the bottom of the stage.

In another embodiment for carrying out the invention the feed material FM is sprayed on the top of a bank of vertical tubes.

It is preferably to operate MED plants used in processes according to the invention in a laminar flow regime with the formation of a thin water film being preferred.

In one embodiment, processes according to the invention use MED with a horizontal tube falling film evaporator. The falling film evaporator with horizontal tube bundles exhibit relatively high heat transfer coefficients under clean surface condition.

In one embodiment, feed material FM is supplied by spraying onto the evaporator tube bundles using nozzles. The supply of feed material FM must be enough to form a water film that evenly wets the surface and flows in a stable manner over the tubes.

Step B) is typically carried out at temperatures of 45 to 180° C., preferably 50 to 95° C. Step B) is typically carried out at pressures of 0.09 to 0.9 bar.

In one embodiment raw water subjected to processes according to the invention has a salt content of 3.0 to 4.5% by weight. In one embodiment raw water subjected to processes according to the invention has a salt content of 3.5 to 4.2% by weight.

In one embodiment raw water subjected to processes according to the invention has a salt content of 0.1 to 3% by weight. In one embodiment raw water subjected to processes according to the invention has a salt content of 0.3 to 2.7% by weight.

According to the invention, a nonionic surfactant S is added to feed material FM in step A) prior to the evaporation (distillation).

The surface tension of nonionic surfactant S is preferably from 25 to 40 mN/m. The surface tension may be analyzed according to DIN 14370 at room temperature at 1 g/L.

In one embodiment, nonionic surfactants S have a wetting according to EN 1772 (distilled water, 2 g soda ash per liter, 23° C., 0.5 g surfactant per liter) of a maximum of 50 s.

Preferably, nonionic surfactants S have a viscosity (water content 0%, EN 12092, Brookfield LVT, 23° C.) of 20 to 1000 mPas.

Preferably, nonionic surfactant S is selected from nonionic surfactants that will reduce the contact angle of saline water on tube materials surface (0.1 g/L in water with salinity of 45 g/kg and at 70° C., determined according to the procedure given in Section IV o the experimental part) by 1 to 40 degrees. The contact angle may be analyzed according to DIN 55660-2.

The nonionic surfactant S is preferably a low foaming nonionic surfactant.

Said at least one nonionic surfactant S is in one embodiment at least one polyalkyleneoxide PAO.

Polyalkyleneoxides PAO shall include polyalkyleneoxides that are not functionalized at its terminal positions, thus bearing OH groups at their terminal positions. PAO shall further include polyalkylene oxides that are etherified at one or more of its terminal positions with an aliphatic group.

In one embodiment, polyalkyleneoxides PAO are alkoxylates of a monoalcohols. Preferably, polyalkyleneoxides PAO are alkoxylates of $C_4$-$C_{30}$ monoalcohols, preferably $C_5$-$C_{26}$ alcohols. Suitable alcohols can be linear or branched. Suitable alcohols include n-decanol, iso-decanol, 2-propylheptanol, tridecanol, octadecanol, butanol, hexanol, nonanol, undecanol, as well as oxo alcohols like 2-ethylhexanol, isodecanol and isononyl alcohol and mixtures thereof.

In one embodiment, polyalkyleneoxides PAO are copolymers comprising at least two different types of alkylene oxides. (When reference is made herein to polyalkyleneoxides "comprising" alkylene oxides, this shall be understood to mean that said polyalkyleneoxide comprises said alkyleneoxides in polymerized, that is ring opened, form.)

In one embodiment, polyalkyleneoxides PAO are block copolymers comprising at least two different types of alkylene oxides.

In one embodiment, polyalkyleneoxides PAO are random copolymers comprising at least two different types of alkylene oxides.

In one embodiment polyalkyleneoxides PAO are composed substantially of oxyalkylene units. The oxyalkylene units may in particular be —$(CH_2)_2$—O—, —$(CH_2)_3$—O—, —$(CH_2)_4$—O—, —$CH_2$—$CH(R^2)$—O—, —$CH_2$—$CHOR^3$—$CH_2$—O—, with $R^2$ being an alkyl group, especially $C_1$-$C_{24}$ alkyl, or an aryl group, especially phenyl, and $R^3$ being a group selected from the group consisting of hydrogen or $C_1$-$C_{24}$ alkyl.

Examples of suitable alkylene oxides as monomers for the polyalkyleneoxides PAO comprise ethylene oxide (EO) and propylene oxide (PO) and also 1,2-butylene oxide, 2,3-butylene oxide, 2-methyl-1,2-propylene oxide (isobutylene oxide), 1-pentene oxide, 2,3-pentene oxide, 2-methyl-1,2-butylene-oxide, 3-methyl-1,2-butylene oxide, 2,3-hexene oxide, 3,4-hexene oxide, 2-methyl-1,2-pentene oxide, 2-ethyl-1,2-butylene oxide, 3-methyl-1,2-pentene oxide, decene oxide, 4-methyl-1,2-pentene oxide, styrene oxide, or be formed from a mixture of oxides of industrially available raffinate streams. Examples of cyclic ethers comprise tetrahydrofuran. It is of course also possible to use mixtures of different alkylene oxides. The skilled worker makes an appropriate selection from among the monomers and further components in accordance with the desired properties of the block.

Polyalkyleneoxides PAO may also be branched or star-shaped. Blocks of this kind are obtainable by using starter molecules having at least 3 arms. Examples of suitable starters comprise glycerol, trimethylolpropane, pentaerythritol or ethylenediamine.

In one embodiment, polyalkyleneoxides PAO comprise blocks of polyethylene oxide (PEO) at the terminal positions, whereas blocks of polyalkylene oxides different from ethylene oxide like polypropylene oxide (PPO), polybutylene oxide (PBO) and poly-THF (pTHF) are comprised in central positions.

In one embodiment polyalkyleneoxides PAO have the structure PEO-PPO-PEO, PPO-PEO-PPO, PEO-PBO-PEO or PEO-pTHF-PEO.

In other embodiments, polyalkyleneoxides PAO have the structure PEO-PPO-pTHF-PPO-PEO. In another embodiment, polyalkyleneoxides PAO are of the structure PEO-PPO/PBO/pTHF-PEO, meaning that the central segment(s) comprise at least two or the alkylene oxides selected from butylene oxide, propylene oxide and/or tetrahydrofurane statistically distributed in the segment or in the form of sub-segments.

Suitable polyalkyleneoxides PAO normally comprise a number average of 1.1 to 100 alkyleneoxide units, preferably 5 to 50 units.

In one embodiment nonionic surfactant S has a molar mass of 500 to 6000 g/mol.

In one preferred embodiment, polyalkyleneoxide PAO is a block copolymer of the structure PEO-PPO-PEO that are not etherified at their terminal positions (thus bearing OH groups in their terminal positions) with a molar mass MW of 2000 to 3000 g/mol (all MW of PAO cited herein are calculated from the OH number as determined according to DIN 53240-1:2013-06 In one preferred embodiment, PAO is a block copolymer PEO-PPO-PEO with a molar mass MW of 3000 to 4000 g/mol.

In one preferred embodiment, PAO is a block copolymer PEO-PPO-PEO with a molar mass MW of 4000 to 5000 g/mol.

In one preferred embodiment, PAO is a block copolymer PEO-PPO-PEO with a molar mass MW of 5000 to 6000 g/mol.

In one embodiment polyalkyleneoxides PAO are end-capped on one side or both sides with an alkyl or aryl group (i.e. etherified with the corresponding alcohol).

Polyalkylenoxides PAO are in one embodiment alcohol alkoxylates represented by the general formula $R^1\text{-}(AO)_n\text{—}OR^2$ where $R^1$ is the hydrocarbon residue of an alcohol which has 5 to 30 carbon atoms; n represents the average number of alkyleneoxy (AO) units in the structure; AO is an alkyleoxy group having 2 to 5 carbon atoms; and where $R^2$ is hydrogen, an alkyl group with 1 to 18 carbon atoms, an alkanoyl group having 1 to 20 carbon atoms, a hydroxyalkyl group or a mixture thereof. $R^1$ groups may include linear, branched, and/or cyclic chains of carbon and hydrogen atoms which may be saturated or unsaturated. However, the hydrocarbon group is typically a linear chain hydrocarbon group. The $R^1$ group preferably has from 6 to 16 carbon atoms, and more preferable has from 8 to 13 carbon atoms. Suitable alkyleneoxy oxide groups include ethyleneoxy groups (2 carbon atoms), propyleneoxy groups (3 carbon atoms), butyleneoxy groups (4 carbon atoms), penteneoxy and combinations thereof. Typically, alkylene oxide is a combination of alkyleneoxy groups. However, ethyleneoxy groups are typically present in an amount at least 40%, alternatively at least 60%, and alternatively at least 70% of all alkyleneoxy groups present in the alcohol alkoxylate. The variable n can take on a wide range of values. For example, it has been found that useful surfactants are obtained when n is less than or equal to 30. It is more preferable that n is less than about 20 and it is most preferable that n is less than about 10. The $R^2$ is preferably hydrogen.

Polyalkyleneoxides PAO are in one embodiment diblock alcohol alkoxylates represented by the general formula $R^1\text{-}(AO1)_a\text{-}(AO2)_b\text{-}OR^2$.

In another embodiment polyalkyleneoxides PAO are triblock alcohol alkoxylates represented by the general formula $R^1\text{-}(AO1)_a\text{-}(AO2)_b\text{-}(AO3)_c\text{—}OR^2$.

In these formulae of alcohol alkoxylates $R^1$ is the hydrocarbon residue of an alcohol which has preferably 5 to 30 carbon atoms; a, b, and c each represent the average number of alkene oxy units in the structure and each are from 1 to 35; AO1, AO2 and AO3 each represent an alkyloxy group selected from the group consisting of ethyleneoxy groups (2 carbon atoms), propyleneoxy groups (3 carbon atoms), butyleneoxy groups (4 carbon atoms), penteneoxy and mixtures thereof, with the proviso that the relative alkyleneoxy groups composition of AO2 differ from that of AO1 and AO3; and where $R^2$ is hydrogen, an alkyl group with 1 to 18 carbon atoms, an alkanoyl group having 1 to 20 carbon atoms, a hydroxyalkyl group or a mixture thereof.

Examples of useful alcohol block alkoxylates are the diblock alkoxylates where the blocks are essentially all ethyleneoxy or essentially all propyleneoxy. These can be represented by the general formulae $R^1\text{-}(EO)_a\text{—}(PO)_b\text{—}OR^2$ or $R^1\text{—}(PO)_a\text{-}(EO)_b\text{—}OR^2$ where $R^1$ is the hydrocarbon residue of an alcohol which has 5 to 30 carbon atoms; a and b are each from 1 to 30; EO represents an ethyleneoxy unit; PO represents an propyleneoxy unit; and where $R^2$ is hydrogen, an alkyl group with 1 to 18 carbon atoms, an alkanoyl group having 1 to 20 carbon atoms, a hydroxyalkyl group or a mixture thereof.

In one embodiment polyalkylenenoxide PAO is a triblock surfactant represented by the general formula $R^3\text{-}(EO)_a\text{—}(PO)_b\text{-}(EO)_c\text{—}R^4$ or $R^3\text{—}(PO)_a\text{-}(EO)_b\text{—}(PO)_c\text{—}R^4$ where a, b, and c each represent the number of ethyleneoxy or propyleneoxy units in each of the blocks; and where $R^3$ and $R^4$ are independently hydrogen, an alkyl group with 1 to 18 carbon atoms, a hydroxyalkyl group with 1 to 18 carbon atoms or a mixture thereof.

Preferred polyoxyethylene polyoxypropylene block surfactants have a number average molecular weight of from about 400 to about 6000, more preferably 500 to 2000. In one embodiment, polyoxyethylene polyoxypropylene block surfactants have a number average molecular weight of 500 to 1000 g/mol. In another embodiment, polyoxyethylene polyoxypropylene block surfactants have a number average molecular weight of 2000 to about 4000. The block surfactants are preferably comprised of about 20% to about 60% by weight of polyoxyethylene blocks, and more preferably from about 25% to about 50%.

In one embodiment, polyalkyleneoxides PAO are of the general formula

where $R^1$ is the hydrocarbon residue of an alcohol which has 5 to 30 carbon atoms; n represents the average number of polyalkyleneoxides AO units in the structure; and where $R^2$ is hydrogen, an alkyl group with 1 to 18 carbon atoms, a hydroxyalkyl group or —CO—$R^3$ (where $R^3$ is hydrocarbon residue of a carboxylic acid which has 1 to 20 carbon atoms) or a mixture thereof. $R^1$ groups may include linear, branched, and/or cyclic chains of carbon and hydrogen atoms which may be saturated or unsaturated. However, the hydrocarbon group is preferably a linear chain hydrocarbon group. The $R^1$ group preferably has from 6 to 16 carbon atoms, and more preferable has from 8 to 13 carbon atoms.

Suitable polyalkyleneoxides PAO that are block copolymers of ethylene oxide and at least one alkylene oxide different from ethylene oxide in one embodiment comprise a number average of 1 to 40 units of ethylene oxide per ethylene oxide block, prefer-ably 1.5 to 30, more preferably 2 to 25, even more preferably 5 to 10 units of ethylene oxide per ethylene oxide block.

Suitable polyalkyleneoxides PAO that are block copolymers of ethylene oxide and at least one alkylene oxide selected from propylene oxide, butylene oxide, pentene oxide and/or tetrahydrofurane in one embodiment normally comprise a number average of 0.1 to 40 units of propylene oxide, butylene oxide, pentene and/or tetrahydrofurane, preferably 1 to 10, and even more preferably 1.0 to 5 units.

In one embodiment, suitable polyalkyleneoxides PAO comprise only ethylene oxide and propylene oxide and comprise a number average of 0.1 to 40 units of propylene oxide preferably 1 to 10 and even more preferably 1.5 to 5 units and the number average molar ratio of propylene oxide to ethylene oxide is from 40:1 to 1:400, preferably 40:1 to 1:300, more preferably 5:1 to 1:100 and especially preferably 5:1 to 1:50. In another embodiment, the number average molar ratio of propylene oxide to ethylene oxide is from 1:40 to 1:1 or 1:35 to 1:1.

In one embodiment, polyalkyleneoxides PAO comprise only ethylene oxide and butylene oxide comprise a of 0.1 to 40 units of butylene oxide preferably 1 to 10 and even more preferably 1.5 to 5 units and the number average molar ratio of butylene oxide to ethylene oxide is from 40:1 to 1:400, preferably 40:1 to 1:300, more preferably 5:1 to 1:100 and especially preferably 5:1 to 1:50. In another embodiment, the number average molar ratio of butylene oxide to ethylene oxide is from 1:40 to 1:1 or 1:35 to 1:1.

In one embodiment, polyalkyleneoxides PAO comprise only ethylene oxide and pentene oxide comprise a number average of 0.1 to 40 units of pentene oxide preferably 1 to 10 and even more preferably 1.5 to 5 units and the number average molar ratio of pentene oxide to ethylene oxide is from 40:1 to 1:400, preferably 40:1 to 1:300, more preferably 5:1 to 1:100 and especially preferably 5:1 to 1:50. In another embodiment, the number average molar ratio of pentene oxide to ethylene oxide is from 1:40 to 1:1 or 1:35 to 1:1.

In one embodiment, polyalkyleneoxides PAO comprise only ethylene oxide and tetrahydrofurane and comprise a number average of 0.1 to 40 units tetrahydrofurane, preferably 1 to 10, more preferably 1.5 to 5 and even more preferably 1.0 to 5 units and the number average molar ratio of tetrahydrofurane to ethylene oxide is from 40:1 to 1:400, preferably 40:1 to 1:300, more preferably 5:1 to 1:100 and especially preferably 5:1 to 1:50. In another embodiment, the number average molar ratio of tetrahydrofurane to ethylene oxide is from 1:40 to 1:1 or 1:35 to 1:1.

The synthesis of polyalkyleneoxides is known to the skilled worker. Details are given, for example, in "*Polyoxyalkylenes*" in Ullmann's Encyclopedia of Industrial Chemistry, 6th Edition, Electronic Release.

Polyalkyleneoxides PAO can preferably be prepared by base-catalyzed alkoxylation. For this purpose, the alcohol $R^1$—OH can be admixed in a pressurized reactor with alkali metal hydroxides, preferably potassium hydroxide, or with alkali metal alkoxides such as, for example, sodium methylate. By means of reduced pressure (for example <100 mbar) and/or by increasing the temperature (30 to 150° C.), water or Methanol still present in the mixture can be removed. The alcohol is then present as the corresponding alkoxide. Thereafter, inert conditions are established with inert gas (e.g. nitrogen) and the alkylene oxide or oxides is/are added stepwise at temperatures of from 60 to 180° C. up to a pressure of not more than 10 bar. At the end of the reaction, the catalyst can be neutralized by addition of acid (e.g. acetic acid or phosphoric acid) and can, if required, be filtered off. It can also be removed using an ion exchanger based on magnesium-silicate. By means of this method, polyalkylene oxides PAO having the preferred polydispersity of from 1.04 to 1.2 can readily be obtained.

The alkoxylation of the alcohols can, however, also be carried out by means of other methods, for example by acid-catalyzed alkoxylation. Furthermore, for example, double hydroxide clays, as described in DE 43 25 237 A1, can be employed or double metal cyanide catalysts (DMC catalysts) can be used. Suitable DMC catalysts are disclosed, for example, in DE 102 43 361 A1, in particular paragraphs [0029] to [0041] and in the literature cited therein. For example, catalysts of the Zn—Co type can be used. For carrying out the reaction, the catalyst can be added to the alcohol $R^1$—OH and the mixture can be dewatered as described above and reacted with the alkylene oxides as described. Usually, not more than 1000 ppm of catalyst, based on the mixture, are used and, owing to this small amount, the catalyst can remain in the product. The amount of catalyst may as a rule be less than 1000 ppm, for example 250 ppm or less.

In one embodiment, said at least one nonionic surfactant S is at least one long-chain aliphatic alcohol AA comprising 6 to 30 carbon atoms.

In one embodiment said aliphatic alcohol AA is a monool like n-decanol, iso-decanol, 2-propylheptanol, tridecanol, octadecanol, butanol, hexanol, nonanol, undecanol, as well as oxo alcohols like 2-ethylhexanol, isodecanol and isononyl alcohol and mixtures thereof.

In one embodiment said aliphatic alcohol AA is a diol.

In one embodiment said aliphatic alcohol AA is an alkyne diol.

A preferred aliphatic alcohol AA that is an alkyne diol is 2,4,7,9-tetramethyl-5-decyne-4,7-diol.

Feed material FM typically comprises nonionic surfactant S in an amount of 0.1 to 1000 ppm by weight based on the solution in feed material, preferably 0.5 to 100 ppm, more preferably 1 to 10 ppm In one embodiment of the invention, feed material FM may further comprise at least one polymer A. Polymers A are polymers comprising at least 30% by weight, preferably at least 50% by weight and more preferably at least 70% by weight of at least one ethylenically unsaturated mono carboxylic acid like acrylic acid and/or at least one ethylenically unsaturated dicarboxylic acid like maleic acid in polymerized form.

When reference is made herein to an ethylenically unsaturated acid like acrylic acid, this shall include polymers of the corresponding acid as well as polymers comprising salts of the corresponding acid like its sodium salts.

Polymers A normally have a molecular weight MW of 500 to 10000 g/mol, preferably 1000 to 5000 g/mol.

In one embodiment polymer A is a homopolymer of acrylic acid. In one embodiment such homopolymers of acrylic acid have a molecular weight MW of 500 to 10000 g/mol, preferably 1000 to 5000 g/mol. In one preferred embodiment the MW of polymer A is 3000 to 4000 g/mol.

In one embodiment polymer A is a copolymer of acrylic acid and other ethylenically unsaturated monocarboxylic acids like methacrylic acid. In one embodiment polymer A is a copolymer of acrylic acid and ethylenically unsaturated dicarboxylic acids like maleic aid. In one embodiment such copolymers of acrylic acid have a molecular weight MW of 500 to 20000 g/mol, preferably 800 to 10000 g/mol, more preferably 1000 to 5000 g/mol.

In one embodiment, feed material FM comprises a blend of a homopolymer of acrylic acid and a copolymer of acrylic acid and maleic acid.

In one embodiment polymer A is selected from homopolymers of acrylic acid, copolymers of acrylic acid and polymaleic acid and from copolymers of maleic acids and mixtures thereof.

In one embodiment polymer A is at least one selected from the group consisting of polymer A1 and polymer A2 and the mixtures thereof as disclosed in WO 2013/020937 on p. 3 In 37 to p. 12, In 25.

In one embodiment Polymer A1 is a water-soluble or water-dispersible polymer having a weight-average molecular weight of 1000 to 20 000 g/mol and consisting of (a1-1) 20 to 80% by weight of at least one monomer selected from the group consisting of $C_2$ to $C_8$ olefins, allyl alcohol, isoprenol, $C_1$ to $C_4$ alkyl vinyl ethers and vinyl esters of $C_1$ to $C_4$ monocarboxylic acids, (a1-2) 20 to 80% by weight of at least one monoethylenically unsaturated $C_3$ to $C_8$ carboxylic acid, an anhydride or salt of same, (a1-3) 0 to 50% by weight of one or more monomers comprising sulfonic acid groups.

Polymer (A2) is preferably a water-soluble or water-dispersible polymer having a weight-average molecular weight of 1000 to 50 000 g/mol and consisting of (a2-1) 30 to 100% by weight of at least one monoethylenically unsaturated $C_3$ to $C_8$ carboxylic acid, an anhydride or salt of same, (a2-2) 0 to 70% by weight of one or more monomers comprising sulfonic acid groups, (a2-3) 0 to 70% by weight of one or more nonionic monomers of the formula

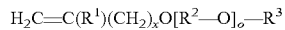

where $R^1$ is hydrogen or methyl, $R^2$ is identical or different, linear or branched, $C_2$-$C_6$ alkylene radicals, which can be arranged in blocks or randomly, and $R^3$ is hydrogen or a linear or branched $C_1$-$C_4$ alkyl radical, x is 0, 1 or 2, and o is a number from 3 to 50.

Mixtures of the polymers (A1) and (A2) have a high activity in the inhibition of sediments of calcium carbonate, calcium sulfate and basic magnesium salts. One or more different polymers (A1) can be mixed with one or more different polymers (A2).

In one embodiment Polymer A comprises 5 to 95% by weight of a water-soluble or water-dispersible polymer (A1) of 20 to 80% by weight of at least one monomer (a1-1) selected from the group consisting of $C_2$ to $C_8$ olefins, allyl alcohol, isoprenol, $C_1$ to $C_4$ alkyl vinyl ethers and vinyl esters of $C_1$ to $C_4$ monocarboxylic acids, and 20 to 80% by weight of at least one monomer (a1-2) selected from unsaturated $C_3$ to $C_8$ carboxylic acids, anhydrides or salts of same, and also, optionally, 0 to 50% by weight of one or more monomers (a1-3) comprising sulfonic acid groups.

In one embodiment Polymer A comprises 5 to 95% by weight of a water-soluble or water-dispersible polymer (A2) of 30 to 100% by weight of at least one monomer (a2-1) selected from monoethylenically unsaturated $C_3$ to $C_8$ carboxylic acids, anhydrides or salts of same, and also, optionally, 0 to 70% by weight of one or more monomers (a2-2) comprising sulfonic acid groups.

Suitable $C_2$ to $C_8$ olefins which can be used as monomer (a1-1) are, for example, ethylene, propylene, n-butene, isobutene, 1-pentene, 1-hexene, 1-heptene and diisobutene, preferably isobutene and diisobutene.

Suitable alkyl vinyl ethers which can be used as monomer (a1-1) comprise 1 to 4 carbon atoms in the alkyl chain. Examples are vinyl methyl ether, vinyl ethyl ether, vinyl n-propyl ether, vinyl isopropyl ether, vinyl n-butyl ether and vinyl isobutyl ether.

Vinyl esters of $C_1$ to $C_4$ monocarboxylic acids which can be used as monomer (a1-1) are, for example, vinyl formate, vinyl acetate, vinyl propionate and vinyl butyrate.

Preferred monomers (a1-1) are isobutene, diisobutene, vinyl acetate, vinyl methyl ether allyl alcohol and isoprenol. Particular preference is given to isobutene, diisobutene and isoprenol.

Suitable monoethylenically unsaturated $C_3$-$C_8$ carboxylic acids which can be used as monomer (a1-2) and (a2-1) are, for example, acrylic acid, methacrylic acid, ethacrylic acid, vinyl acetic acid, allyl acetic acid, crotonic acid, maleic acid, fumaric acid, mesaconic acid and itaconic acid and also water-soluble salts thereof. If said unsaturated $C_3$-$C_8$ carboxylic acids can form anhydrides, these anhydrides are also suitable as monomer (a1-1), for example maleic anhydride, itaconic anhydride and methacrylic anhydride.

Preferred monoethylenically unsaturated $C_3$-$C_8$ carboxylic acids are acrylic acid, methacrylic acid, maleic acid and fumaric acid and also anhydrides and water-soluble salts thereof. These are preferred both as monomer (a1-2) and monomer (a1-1). Water-soluble salts are, in particular, the sodium and potassium salts of the acids.

Monomers comprising sulfonic acid groups (a1-3) and (a2-2) are preferably those of the formula (a) and (b)

where X is an optionally present spacer group which can be selected from —$(CH_2)_n$- where n=0 to 4, —$C_6H_4$—, —$CH_2$—O—$C_6H_4$—, —C(O)—NH—C(CH$_3$)$_2$—, —C(O)—NH—CH(CH$_2$CH$_3$)—, —C(O)NH—CH(CH$_3$)CH$_2$—, —C(O)NH—C(CH$_3$)$_2$CH$_2$—, —C(O)NH—CH$_2$CH(OH)CH$_2$—, —C(O)NH—CH$_2$—, —C(O)NH—CH$_2$CH$_2$— and —C(O)NH—CH$_2$CH$_2$CH$_2$—.

Particularly preferred monomers comprising sulfonic acid groups are in this case 1-acrylamido-1-propanesulfonic acid (X=—C(O)NH—CH(CH$_2$CH$_3$)—) in formula (a), 2-acrylamido-2-propanesulfonic acid (X=—C(O)NH—CH(CH$_3$)CH$_2$—) in formula (a), 2-acrylamido-2-methylpropanesulfonic acid (AMPS, X=—C(O)NH—C(CH$_3$)$_2$CH$_2$—) in formula (a), 2-methacrylamido-2-methylpropanesulfonic acid (X=—C(O)NH—C(CH$_3$)$_2$CH$_2$—) in formula (b), 3-methacrylamido-2-hydroxypropanesulfonic acid (X=—C (O)NH—CH₂CH(OH)CH₂— in formula (b), allylsulfonic acid (X=CH₂ in formula IIa), methallylsulfonic acid (X=CH₂ in formula (b), allyloxybenzenesulfonic acid (X=CH₂—O—C₆H₄— in formula IIa), methallyloxybenzenesulfonic acid (X=CH₂—O—C₆H₄— in formula (b), 2-hydroxy-3-(2-propenyloxy)propane-sulfonic acid, 2-methyl-2-propene-1-sulfonic acid (X=CH₂ in formula (b), styrenesulfonic acid (X=C₆H=in formula (a), vinylsulfonic acid (X not present in formula (a), 3-sulfopropyl acrylate (X=C(O)O—CH₂CH₂CH₂— in formula (a), 2-sulfoethyl methacrylate (X=C(O)O—CH₂CH₂— in formula (b), 3-sulfopropyl methacrylate (X=C(O)O—CH₂CH₂CH₂— in formula (b), sulfomethacrylamide (X=C(O)NH— in formula (b), sulfomethylmethacrylamide (X=C(O)NH—CH₂— in formula (b), and also salts of said acids. Suitable salts are generally water-soluble salts, preferably the sodium, potassium and ammonium salts of said acids.

Particular preference is given to 1-acrylamidopropanesulfonic acid, 2-acrylamido-2-propanesulfonic acid, 2-acrylamido-2-methylpropanesulfonic acid (AMPS), 2-methacrylamido-2-methylpropanesulfonic acid, 3-methacrylamido-2-hydroxypropanesulfonic acid, 2-hydroxy-3-(2-propenyloxy) propanesulfonic acid, 2-sulfoethyl methacrylate, styrenesulfonic acid, vinylsulfonic acid, allylsulfonic acid (AMPS) and methallylsulfonic acid, and also salts of said acids. These are preferred both as monomer (a1-3) and also (a2-2).

Very particularly preferred monomers comprising sulfonic acid groups are 2-acrylamido-2-methylpropanesulfonic acid (AMPS) and allylsulfonic acid, and also water-soluble salts thereof, in particular sodium, potassium and ammonium salts thereof. These are preferred both as monomer (a1-3) and (a2-2).

As component (a2-3), the copolymer comprises 0 to 70% by weight of at least one nonionic monomer of the formula

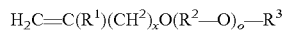

where $R^1$ is hydrogen or methyl, $R^2$ is identical or different $C_2$-$C_6$ alkylene radicals, which can be linear or branched and arranged in blocks and/or randomly, and $R^3$ is hydrogen or a linear or branched $C_1$-$C_4$ alkyl radical, x is 0, 1 or 2, and o is a natural number from 3 to 50.

The alkylene radicals can also be arranged in blocks and randomly, that is to say in one or more blocks of identical alkylene oxide radicals in blocks and, in addition, randomly in one or more blocks of two or more different alkylene oxide radicals. This is also included by the wording "arranged in blocks or randomly".

Preferred nonionic monomers (a2-3) are those based on allyl alcohol ($R^1$=H; x=1) and isoprenol ($R^1$=methyl; x=2).

The nonionic monomer (a2-3) preferably comprises on average 8 to 40, particularly preferably 10 to 30, especially 10 to 25, alkylene oxide units. The index o in the formula (I) relates to the median number of alkylene oxide units.

Preferred alkylene oxide units $R^2$—O are ethylene oxide, 1,2-propylene oxide and 1,2-butylene oxide, particular preference is given to ethylene oxide and 1,2-propylene oxide.

In a special embodiment, the nonionic monomers (a2-3) only comprise ethylene oxide units. In a further special embodiment, the nonionic monomers (a2-3) comprise ethylene oxide and 1,2-propylene oxide units which can be arranged in blocks or randomly.

Preferably, $R^3$ is hydrogen or methyl.

Generally, the weight-average molecular weight of the copolymers (A1) is 1000 to 20 000 g/mol, preferably 1500 to 15 000 g/mol, and particularly preferably 2000 to 10 000 g/mol, and in particular 2000 to 8000 g/mol.

The molecular weight is determined by means of gel-permeation chromatography in comparison with polyacrylic acid standards.

Generally, the polydispersity index of the polymers (A1) Mw/Mn is ≤3.0, preferably ≤2.5.

The polymers (A1) are preferably binary copolymers or terpolymers. If they are binary copolymers, they preferably comprise 20 to 60% by weight of monomer (a1-1) and 40 to 80% by weight of monomer (a1-2), particularly preferably 25 to 50% by weight of monomer (a1) and 50 to 75% by weight of monomer (a1-2).

If they are terpolymers, they preferably comprise 25 to 50% by weight of monomer (a1-1), 30 to 60% by weight of monomer (a1-2) and 10 to 30% by weight of monomer (a1-3).

A plurality of different monomers (a1-1) and/or a plurality of different monomers (a1-2) can also be present in the polymers (A1). For example, terpolymers and quaterpolymers can comprise only monomers (a1-1) and (a1-2), preferably in the amounts stated above for binary copolymers.

In a preferred embodiment of the invention, polymer (A1) is a copolymer of isobutene and maleic acid, preferably in the quantitative ratios stated above for binary copolymers.

In a further preferred embodiment of the invention, polymer (A1) is a copolymer of isoprenol and maleic acid, preferably in the quantitative ratios cited above for binary copolymers.

In a further embodiment of the invention, polymer (A1) is a terpolymer of isoprenol, maleic acid and 2-acrylamido-2-methylpropanesulfonic acid, preferably in the quantitative ratios cited above for terpolymers. In a further preferred embodiment, allylsulfonic acid is used instead of 2-acrylamido-2-methylpropanesulfonic acid.

In a further preferred embodiment of the invention, polymer (A1) is a terpolymer of isoprenol, maleic acid and acrylic acid, preferably in the quantitative ratios cited above.

The polymers (A2) are homopolymers or copolymers. Copolymers can comprise monomers (a2-1), monomers (a2-1) and (a2-2), monomers (a2-1) and (a2-3), and monomers (a2-1), (a2-2) and (a2-3). If copolymers of the monomers (a2-1) and (a2-2) are concerned, they preferably comprise 50 to 90% by weight of monomers (a2-1) and 10 to 50% by weight of monomers (a2-2), particularly preferably 60 to 85% by weight of monomers (a2-1) and 15 to 40% by weight of monomers (a2-2).

If copolymers of the monomers (a2-1) and (a2-3) are concerned, they preferably comprise 50 to 95% by weight of monomers (a2-1) and 5 to 50% by weight of monomers (a2-3), particularly preferably 60 to 90% by weight of monomers (a2-1) and 10 to 40% by weight of monomers (a2-3).

If copolymers of the monomers (a2-1), (a2-2) and (a2-3) are concerned, they preferably comprise 30 to 80% by weight of monomers (a2-1), 10 to 50% by weight of monomers (a2-2) and 5 to 50% by weight of monomers (a2-3), particularly preferably 40 to 75% by weight of monomers (a2-1), 15 to 40% by weight of monomers (a2-2) and 5 to 40% by weight of monomers (a2-3). Preference is given to binary copolymers, but they can also be terpolymers.

In a preferred embodiment of the invention, the polymer (A2) is an acrylic acid homopolymer.

In a further preferred embodiment of the invention, polymer (A2) is a copolymer of acrylic acid and 2-acrylamido-2-methylpropanesulfonic acid, preferably in the quantitative ratios cited above.

In a further preferred embodiment of the invention, polymer (A2) is a copolymer of acrylic acid and allylsulfonic acid, preferably in the quantitative ratios cited above.

Generally, the weight-average molecular weight of the polymers (A2) is 1000 to 50 000 g/mol, preferably 1000 to 30 000 g/mol and particularly preferably 1500 to 20 000 g/mol, and in particular 1500 to 10 000 g/mol.

The molecular weight is determined by means of gel-permeation chromatography in comparison with polyacrylic acid standards.

Generally, the polydispersity index of the polymers (A2) Mw/Mn is 2.5, preferably 2.0.

In one embodiment polymer A is a composition comprising
(A1) 3 to 95% by weight of the water-soluble or water-dispersible polymers having a weight-average molecular weight of 1000 to 20 000 g/mol of
  (a1-1) 20 to 80% by weight of at least one monomer selected from the group consisting of $C_2$ to $C_8$ olefins, allyl alcohol, isoprenol, $C_1$ to $C_4$ alkyl vinyl ethers and vinyl esters of $C_1$ to $C_4$ monocarboxylic acids,
  (a1-2) 20 to 80% by weight of at least one monoethylenically unsaturated $C_3$ to $C_8$ carboxylic acid, an anhydride or salt of same,
  (a1-3) 0 to 50% by weight of one or more monomers comprising sulfonic acid groups,
(A2) 3 to 95% by weight of the water-soluble or water-dispersible polymer having a weight-average molecular weight of 1000 g/mol to 50 000 g/mol of
  (a2-1) 30 to 100% by weight of at least one monoethylenically unsaturated $C_3$ to $C_8$ carboxylic acid, an anhydride or salt of same,
  (a2-2) 0 to 70% by weight of one or more monomers comprising sulfonic acid groups, (a2-3) 0 to 70% by weight of one or more nonionic monomers of the formula $$H_2C=C(R^1)(CH_2)_xO[R^2-O]_o-R^3$$

where $R^1$ is hydrogen or methyl, $R^2$ is identical or different, linear or branched, $C_2$-$C_6$ alkylene radicals, which can be arranged in blocks or randomly, and $R^3$ is hydrogen or a linear or branched $C_1$-$C_4$ alkyl radical, x is 0, 1 or 2, and o is a number from 3 to 50,
(A3) 0 to 80% by weight of phosphonates,
(A4) 0 to 90% by weight of water;
(A5) 0 to 50% by weight of additives such as polyphosphates, zinc salts, molybdate salts, organic corrosion inhibitors, biocides, complexing agents, surfactants or antifoams.

The weight ratio of polymers (A1):(A2) is generally from 1:20 to 20:1.

Polymer A can optionally comprise up to 80% by weight phosphonates (A3). Phosphonates can additionally support the deposit-inhibiting activity of the polymers. In addition, they act as corrosion inhibitors.

Examples of phosphonates are 1-hydroxyethane-1,1-diphosphonic acid (HEDP), 2-phosphonobutane-1,2,4-tricarboxylic acid (PBTC), aminotrimethylenephosphonic acid (ATMP), diethylenetriaminepenta(methylenephosphonic acid) (DTPMP) and ethylenediaminetetra(methylenephosphonic acid) (EDTMP), and also the water-soluble salts thereof, in particular the sodium, potassium and ammonium salts thereof.

In addition, the compositions according to the invention can comprise up to 90% by weight of water.

In addition, the formulations can, in addition to the polymer mixtures according to the invention, optionally the phosphonates, and optionally water, according to requirements, also comprise up to 50% by weight of further additives (A5) such as polyphosphates, zinc salts, molybdate salts, organic corrosion inhibitors such as benzotriazole, tolyltriazole, benzimidazole or ethynyl carbinol alkoxylates, biocides, complexing agents and/or surfactants.

Said at least one Polymer A is typically comprised in feed material FM in an amount of 0 to 1000 ppm by weight based on the solution in feed material FM, preferably 0.1 to 20 ppm, and more preferably 0.1 to 10 ppm by weight.

In one embodiment of the invention, feed material FM further comprise at least one polymer F. Polymer F is a copolymer comprising at least one polyolefinic block, preferably with a molar mass from 500 to 1000 g/mol, and at least one polyalkylene oxide block comprising from 2 to 100, preferably 5 to 50 alkylene oxide units in polymerized form.

In one embodiment the general formula of polymer F is $$R^5\text{-}(AO)_n$$

where $R^5$ is polyolefin selected from polymers of ethylene, propylene, butylene or mixtures thereof with a molecular mass MW of 500-1000 g/mol; AO denotes at least one alkylene oxide like ethylene oxide or propylene oxide and n is a number from 2 to 100, preferably 5 to 50.

Polymer F is typically comprised in feed material FM in an amount of 0 to 100 ppm by weight based on the solution in feed material FM, preferably 0.01 to 50 ppm and more preferably 0.05 to 10 ppm.

In one embodiment of the invention, feed material FM comprises 0.1 to 1000 ppm by weight of nonionic surfactant S and no polymer A and no polymer F.

In one embodiment of the invention, feed material FM comprises 0.1 to 1000 ppm by weight of nonionic surfactant S, 0.1 to 1000 ppm by weight of polymer A and no polymer F.

In one embodiment of the invention, feed material FM comprises 0.1 to 1000 ppm by weight of nonionic surfactant S, 0.01 to 100 ppm by weight of polymer F and no polymer A.

In one embodiment of the invention, feed material FM comprises 0.1 to 1000 ppm by weight of nonionic surfactant S, 0.1 to 1000 ppm by weight of polymer A and 0.01 to 100 ppm by weight of polymer F.

In one embodiment, nonionic surfactant S, polymer A and polymer F are added to raw water successively.

In one embodiment, nonionic Surfactant S, as well as polymer A and polymer F where applicable are added to feed material FM in one formulation.

Processes according to the invention are suitable for different types of thermal desalination processes.

They are especially suitable for MED processes, particularly for MED processes using a plurality of horizontally arranged heated tubes.

Processes according to the invention can in principle be applied to MED apparatuses regardless of the tube material.

In one preferred embodiment, the tube material in MED apparatuses is selected from aluminum brass, titanium, stainless steel, alloys of copper/nickel, alloys of aluminum/magnesium, polymer composite comprising graphite and at least one organic polymer like polypropylene. Metallic tubes in MED apparatuses may further ceramic coatings.

Processes according to the invention are easy and economical to carry out.

They provide desalinated water with a high efficiency.

Processes according to the invention result in a reduced formation of scale. It was an unexpected result of the present invention that under the process conditions of thermal desalination and especially MED, the presence of nonionic surfactant S effectively reduced the formation of scale and showed a synergistic effect when combined with other antiscalants like polymer A.

Processes according to the invention further permit running the desalination process under MED conditions with a very thin film thickness of raw water on the heating tubes yet while maintaining the film without film breakdown.

Processes according to the invention further permit running the desalination process under MED conditions without dry patches occurring on the tubes during the process.

Processes according to the invention further showed very favorable, that is a very homogenous and even wetting behavior of the tube surface by the feed material FM.

Processes according to the invention are very energy efficient and can be operated at a very high overall heat transfer.

Processes according to the invention allow MED processes to be conducted with low wetting rates of the tubes. Processes according to the invention allow MED processes to be conducted without generating dry patched on the tubes in MED apparatuses.

Processes according to the invention require only little energy for pumping the feed material FM.

Another aspect of the present invention are formulations B (also referred to as blends B) comprising:
a) 0.1 to 99% by weight of at least one nonionic surfactant S selected from polyalkyleneoxides PAO,
b) 0.1 to 99% by weight of at least one polymer A,
c) 0 to 50% by weight of at least one polymer F that is block copolymer comprising a polyolefinic block and at least one polyalkylene oxide block,
d) 0 to 80% by weight of water.

In a preferred embodiment components a) to d) in formulation B add up to 100%.

In one embodiment formulations B comprise
a) 0.1 to 99% by weight of at least one nonionic surfactant S selected from polyalkyleneoxides PAO,
b) 0.1 to 99% by weight of at least one polymer A,
c) 0 to 50% by weight of at least one polymer F that is block copolymer comprising a polyolefinic block and at least one polyalkylene oxide block,
d) 0 to 80% by weight of water,
e) 0 to 50% by weight of phosphonates and/or polyphosphates.

In a preferred embodiment components a) to e) in formulation B add up to 100%.

In one embodiment formulations B comprise
a) 0.1 to 99% by weight of at least one nonionic surfactant S selected from polyalkyleneoxides PAO,
b) 0.1 to 99% by weight of at least one polymer A,
c) 0 to 50% by weight of at least one polymer F that is block copolymer comprising a polyolefinic block and at least one polyalkylene oxide block,
d) 0 to 80% by weight of water,
e) 0.1 to 50% by weight of phosphonates and/or polyphosphates.

In a preferred embodiment components a) to e) in formulation B add up to 100%.

In one embodiment formulations B comprise
a) 0.1 to 99% by weight of at least one nonionic surfactant S selected from polyalkyleneoxides PAO,
b) 0.1 to 99% by weight of at least one polymer A,
c) 0.1 to 50% by weight of at least one polymer F that is block copolymer comprising a polyolefinic block and at least one polyalkylene oxide block,
d) 0 to 80% by weight of water,
e) 0.1 to 50% by weight of phosphonates and/or polyphosphates.

In a preferred embodiment components a) to e) in formulation B add up to 100%.

Components of formulations B shall have the same meaning and encompass the same preferred embodiments as defined above.

EXAMPLES

Materials Used:

Nonionic Surfactant 1: $C_9$-$C_{11}$ Oxoalkohol alkoxylated with a molar average of 7 EO units and 1.5 butylene oxide units (block copolymer alkoxylated in the order given).

Nonionic Surfactant 2: alkoxylated fatty alcohol containing higher alkene oxides and ethylene oxide bearing a terminal OH group.

Nonionic Surfactant 3: $C_{10}$ Oxoalkohol alkoxylated with a molar average of 10 EO units and 1.5 mol pentene oxide, prepared according to the procedure given in WO 03/090531, p. 34, ln 24-36 (comparative example 3).

Nonionic Surfactant 4: 2-propylheptyl alcohol alkoxylated with a molar average of 5.7 EO and 4.7 PO, prepared analogously to the procedure given in WO 2005/37757, p. 13, ln 6-23 (example 1).

Nonionic Surfactant 5: 2-propylheptyl alcohol alkoxylated with a molar average of 5.7 EO, 4.7 PO and 2.3 EO, prepared analogously to the procedure given in WO 2005/37757, p. 13, ln 6-23 (example 1).

Nonionic Surfactant 6: $C_{13}$ Oxoalkohol alkoxylated with a molar average of 27 EO units and 1 PO units and esterified with $C_8$-$C_{18}$ fatty acid, prepared according to the procedure given in WO06/097435 on page 20 ln 20 to P. 21, ln 8 (example 1).

Nonionic Surfactant 7: Block copolymer in which the central polypropylene glycol group is flanked by two polyethylene glycol groups, wherein the central polypropylene block has a molar mass of 1750 g/mol and wherein the weight percentage of polyethylene glycol in the polymer is 20%, the molar mass of the nonionic surfactant is 2450 g/mol (calculated from OH number), the viscosity (EN 12092, 23° C., Brookfield, 60 rpm) is 500 mPas, the wetting is (EN 1772, 23° C., 2 g/l soda ash, 1 g/l surfactant) is >300 s and the surface tension (EN 14370, 1 g/l, 23° C., under application of Harkins-Jordan correction) is 41 mN/m.

Nonionic Surfactant 8: Block copolymer in which the central polypropylene glycol group is flanked by two polyethylene glycol groups, wherein the central polypropylene block has a molar mass of 1750 g/mol and wherein the weight percentage of polyethylene glycol in the polymer is 40%, the molar mass of the nonionic surfactant is 2900 g/mol (calculated from OH number), the viscosity (EN 12092, 23° C., Brookfield, 60 rpm) is 1000 mPas, the wetting is (EN 1772, 23° C., 2 g/l soda ash, 1 g/l surfactant) is >300 s and the surface tension (EN 14370, 1 g/l, 23° C., under application of Harkins-Jordan correction) is 41 mN/m.

Nonionic Surfactant 9: Block copolymer in which the central polypropylene glycol group is flanked by two polyethylene glycol groups, wherein the central polypropylene block has a molar mass of 2750 g/mol and wherein the weight percentage of polyethylene glycol in the polymer is 20%, the molar mass of the nonionic surfactant is 3650 g/mol (calculated from OH number), the viscosity (EN 12092, 23° C., Brookfield, 60 rpm) is 900 mPas, the wetting is (EN 1772, 23° C., 2 g/l soda ash, 1 g/l surfactant) is 100 s and the surface tension (EN 14370, 1 g/l, 23° C., under application of Harkins-Jordan correction) is 35 mN/m.

Nonionic Surfactant 10: Block copolymer in which the central polyethylene glycol group is flanked by two polypropylene glycol groups, wherein the central polyethylene block has a molar mass of 430 g/mol and wherein the weight percentage of polyethylene glycol in the polymer is 20%, the molar mass of the nonionic surfactant is 2150 g/mol (calculated from OH number), the viscosity (EN 12092, 23° C., Brookfield, 60 rpm) is 450 mPas, the wetting is (EN 1772, 23° C., 2 g/l soda ash, 1 g/l surfactant) is >300 s and the surface tension (EN 14370, 1 g/l, 23° C., under application of Harkins-Jordan correction) is 38 mN/m.

Nonionic Surfactant 11: Block copolymer in which the central polypropylene glycol group is flanked by two polyethylene glycol groups, wherein the central polypropylene block has a molar mass of 930 g/mol and wherein the weight percentage of polyethylene glycol in the polymer is 30%, the molar mass of the nonionic surfactant is 3100 g/mol (calculated from OH number), the viscosity (EN 12092, 23° C., Brookfield, 60 rpm) is 600 mPas, the wetting is (EN 1772, 23° C., 2 g/l soda ash, 1 g/l surfactant) is >300 s and the surface tension (EN 14370, 1 g/l, 23° C., under application of Harkins-Jordan correction) is 40 mN/m.

Nonionic Surfactant 12: sorbitan monostearate alkoxylated with a molar average of 20 EO units, OH number 81-96, saponification number (ISO 3657) 45-55.

Antiscalant 1: Modified Polycarboxylate, sodium salt with a density (DIN 51757, 23° C.) of 1.26 g/cm³ and a viscosity (DIN 53018, Brookfield, 60 rpm, 23° C.) of 200 mPas.

I. Test Rig

A horizontal tube falling film evaporation in pilot plant scale was employed in order to test the film flow characteristics of falling seawater films and scale formation of heated tube surface under conditions that are close to those prevailing in industrial multiple-effect distillers (MED).

The schematic diagram of the pilot plant scale test rig is shown in FIG. 1 (A=Vacuum pump; B=Collecting tank; C=Condensate; D=Distillate; E=Brine; F=Collecting tank; G=Recirculation pump; H=Sampling; I=Seawater; J=Vapour; K=Condenser; L=Electric steam generator; M=Steam).

Figure 2:
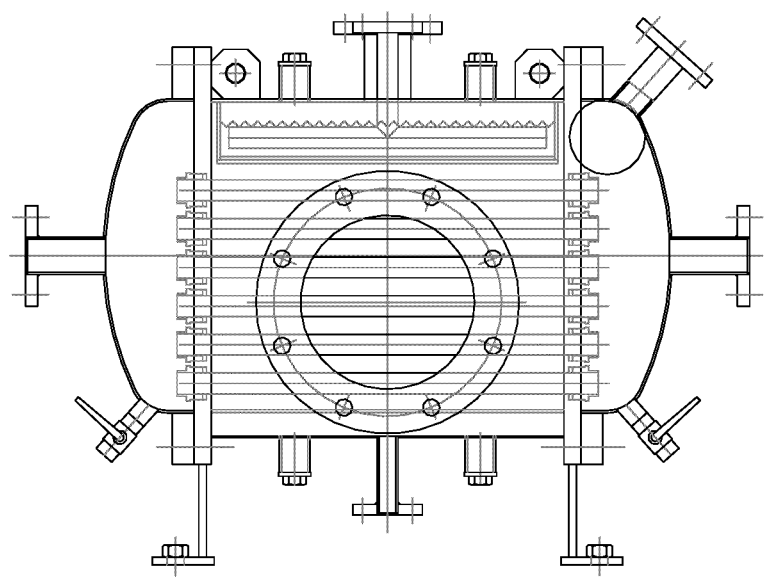
FIG. 2, depicts a pilot scale test rig comprising a horizontal tube falling film evaporator fitted with a bank of 6 horizontal tubes arranged below each other with a tube pitch of s=50 mm.

The pilot scale test rig comprised a horizontal tube falling film evaporator fitted with a bank of 6 horizontal tubes arranged below each other with a tube pitch of s=50 mm as shown in FIG. 2. Saturated steam from an electrical steam generator was introduced into the tubes and condensed under vacuum conditions while the heat was transferred to the evaporation side. The test liquid was evenly distributed onto the first tube by means of a toothed overflow weir and trickles down by gravity forming a thin film flow over the horizontal tubes. The enthalpy of condensation was used to preheat the test liquid to the boiling point on the upper tube and then part of it to be evaporated on the lower tubes. The generated vapor was condensed in a plate heat exchanger. After leaving the evaporator, the test liquid flowed into a collecting tank and was mixed with the distillate. Then the test liquid was recirculated by a pump.

Carbon dioxide released from evaporating seawater and ambient air potentially penetrated into the evaporator were extracted by means of a vacuum pump which maintained the saturation pressure in the evaporator shell. The pilot plant provided conditions for $CO_2$ release from seawater very similar to those in industrial multiple-effect distillers (MED). Carbon dioxide release shifted the pH value of the seawater to higher values and influenced the carbonate system.

The test rig was equipped with various temperature, pressure, and flow rate measuring devices in order to monitor and control the process as shown in FIG. 1. Control of the apparatus was completely automatic in order to maintain continuous, steady operation over long periods which is essential to obtain reproducible scaling results.

The tubes could be removed from the tube sheets in order to renew the tubes, to test different tube materials, and to analyze the adherent scale. On both sides of the evaporator, inspection glasses were installed which allow for a visual observation of the wetting behavior.

II. Test Materials

Artificial seawater was used in test series for investigating scale formation. Deionized water was used in test series for investigating the wetting behavior of different tube materials and the impact of Nonionic Surfactant S on the tube wetting behavior.

The preparation of artificial seawater was based on salt mole fractions for standard artificial seawater as suggested in the formulation by Kester et al. (Kester, D. R.; Duedall, I. W.; Connors, D. N.; Pytkowicz, R. M., Preparation of artificial seawater, Limnology and Oceanography, 12 (1967) 176-179).

The tube material surfaces were characterized by measuring contact angles of artificial seawater with salinity of 45 g/kg at temperature of 70° C. The impact of Nonionic Surfactant S on the contact angle was measured with dilute solution of Nonionic Surfactant S in the artificial seawater with salinity of 45 g/kg. The concentration of Nonionic Surfactant S was 100 ppm by weight based on the solution.

Scaling experiments were performed with artificial seawater having a salinity of 65 g/kg simulating the concentrated seawater on the bottom tubes in industrial MED plants taking into account a typical concentration factor between 1.3 and 1.6. Seawater with a salinity of 65 g/kg has an ionic strength of 1.39 mol/kg.

Table 1 shows the amount of different salts which were used to prepare the artificial seawater with salinity of 65 g/kg and Table 2 shows the concentration of different ion present in the artificial seawater. After mixing the salts and stirring the solution, the artificial seawater was aerated. The aeration tended to equilibrate the solution with atmospheric gases and removed the excess $CO_2$ resulting from the conversion of $HCO_3^-$ to $CO_3^{2-}$. The pH of the artificial seawater after aeration was between 8.1 and 8.3.

TABLE 1

Formula for 1 kg artificial seawater with salinity of 45 g/kg and 65 g/kg

| Salt | Salinity = 45 g/kg g per kg of solution | Salinity = 65 g/kg g per kg of solution |
|---|---|---|
| NaCl | 30.762 | 44.434 |
| $Na_2SO_4$ | 5.153 | 7.443 |
| KCl | 0.870 | 1.257 |
| $NaHCO_3$ | 0.252 | 0.364 |
| KBr | 0.126 | 0.182 |
| $H_3BO_3$ | 0.033 | 0.048 |
| NaF | 0.004 | 0.006 |
| $MgCl_2 \cdot 6H_2O$ | 13.926 | 20.115 |
| $CaCl_2 \cdot 2H_2O$ | 1.953 | 2.821 |
| $SrCl_2 \cdot 6H_2O$ | 0.031 | 0.045 |

Deionized water to 1,000.000 g

TABLE 2

Composition of ions in artificial seawater with salinity of 45 g/kg and 65 g/kg

| Ion | Salinity = 45 g/kg Concentration (g/kg) | Salinity = 65 g/kg Concentration (g/kg) |
|---|---|---|
| $Cl^-$ | 24.882 | 35.941 |
| $Na^+$ | 13.841 | 19.992 |
| $SO_4^{2-}$ | 3.486 | 5.035 |
| $Mg^{2+}$ | 1.665 | 2.405 |
| $Ca^{2+}$ | 0.532 | 0.769 |
| $K^+$ | 0.496 | 0.719 |
| $HCO_3^-$ | 0.183 | 0.264 |
| $Br^-$ | 0.085 | 0.123 |
| $Sr^{2+}$ | 0.010 | 0.015 |
| $H_3BO_3$ | 0.033 | 0.048 |
| $F^-$ | 0.001 | 0.002 |

III. Tube Materials

The horizontal tubes used in the experiments were made of copper-nickel 90/10, aluminium alloy AlMg2.5 (containing 2.4-2.8% magnesium), or aluminium brass.

The outer diameter of the tubes was $d_o=25$ mm. The effective length was L=453 mm. For studying the wetting behavior and scale formation, unless stated otherwise the tubes were used with their typical surface topography as delivered by the tube suppliers. For some specific wetting and scale formation tests, the copper-nickel 90/10 tube was pretreated by soaking it in artificial seawater with salinity of 65 g/kg for 8 weeks prior to be used in the tests. This pretreatment caused the formation of a thin, adherent, protective surface film which is complex, multilayered and mainly comprised of cuprous oxide on the copper-nickel 90/10 tube surface. The pretreated copper-nickel 90/10 tube is denoted as CuNi 90/10-PT. The surface roughness was determined using a tactile stylus unit (perthometer) according to DIN EN ISO 4288. The tube materials, thermal conductivities, outer diameters, wall thicknesses, and surface roughnesses are summarized in Table 3.

TABLE 3

Physicochemical data of the horizontal tubes/Thermal Conductivity determined according to the procedure given in; Müller-Steinhagen, H., Fouling of Heat Exchanger Surfaces, In: VDI Heat Atlas, VDI-Gesellschaft (ed.), Springer-Verlag, Berlin Heidelberg, 2013, pp. 91-121); UNS No.: Unified Numbering System No. for metal alloys.

| Alloy | UNS No. | Thermal conductivity (W/(m K)) | Outer diameter (mm) | Wall thickness (mm) | Surface roughness $R_a$ (μm) |
|---|---|---|---|---|---|
| CuNi 90/10 | C70600 | 52 (20° C.) 60 (100° C.) | 25 | 1.0 | 0.28 |
| AlMg2.5 | A95052 | 134/140 (0° C.) 146 (100° C.) | 25 | 1.25 | 0.46 |
| Al brass | C68700 | 100 (20° C.) 112 (100° C.) | 25 | 1 | 0.44 |

IV. Tube Surface Characterization

The tube material surfaces were characterized by measuring contact angles of artificial seawater with salinity of 45 g/kg prepared according to the procedure given in section II of the experimental part at temperature of 70° C. using an OCA 15 Pro contact angle measuring and contour analysis instrument manufactured by Dataphysics according to DIN 55660-2. The impact of nonionic surfactant S on the contact angle was measured with dilute solution of Nonionic Surfactant S in the artificial seawater. The concentration of Nonionic Surfactant S was 100 ppm by weight based on the solution. Before measuring the contact angle, the surface was thoroughly cleaned with isopropyl alcohol to remove any deposits, grease, oil, etc. The advancing contact angle was measured using a sessile drop method according to DIN 55660-2. A sessile drop was formed on the surface by means of a syringe needle and the volume of the drop was slowly increased. In doing so, the interface migrates outwards. One second after the drop was placed on the surface, the image of the liquid droplet was digitized by means of a CCD camera and a data processing system. A contour recognition was initially carried out and afterwards the drop shape was fitted to the contour. The angle formed between the liquid/solid interface and the liquid/vapour interface was taken as the contact angle. Table 4 shows the impact of nonionic surfactant S on contact angle of artificial seawater with salinity of 45 g/kg at temperature of 70° C. on different tube surfaces.

TABLE 4

The impact of Nonionic Surfactant S on contact angle of artificial seawater with salinity of 45 g/kg at temperature of 70° C. on different tube surfaces.

| | Contact angle difference (Δ°) on material surface* | |
|---|---|---|
| Nonionic surfactant S | CuNi 90/10 | AlMg2.5 |
| Nonionic Surfactant 1 | 25 | 18 |
| Nonionic Surfactant 2 | 27 | 10 |
| Nonionic Surfactant 3 | 30 | 4 |
| Nonionic Surfactant 4 | 28 | 10 |
| Nonionic Surfactant 5 | 27 | 5 |
| Nonionic Surfactant 6 | 16 | 2 |
| Nonionic Surfactant 7 | 26 | 16 |
| Nonionic Surfactant 8 | 27 | 9 |
| Nonionic Surfactant 9 | 22 | 6 |
| Nonionic Surfactant 10 | 25 | 4 |
| Nonionic Surfactant 11 | 30 | 11 |

*Contact angle difference (Δ°) = contact angle of 100 ppm Nonionic Surfactant S solution in artificial seawater with salinity of 45 g/kg - contact angle of artificial seawater with salinity of 45 g/kg.

V. Tube Wetting Experiments

The wetting behavior of different tube materials with different Nonionic Surfactants was investigated using the test rig described above. Prior to each test, the tube surface was thoroughly cleaned with soap solution, rinsed with deionized water and cleaned again with isopropyl alcohol to remove any deposits, grease, oil, etc. The wetting experiments were conducted using deionized water containing Nonionic Surfactant S with concentration of 1 and 100 ppm by weight based on the solution as given in table 5. The wetting experiment were conducted as follows: starting with completely dry tube surfaces, the wetting rate was stepwise increased with increments of about 0.005-0.01 kg/(s m). At each wetting rate, pictures were taken of the film flow over the top 5 tubes after 10 minute relaxation time. The percentages of the wet surface areas on the tube surfaces were evaluated by means of an image processing software. The top tube was not taken into account in the picture analysis because it was observed that the top tube serves as some sort of distribution tube for the liquid flow. The film flow over about 63% of the tube length was considered in the picture analysis. The non-relevant areas between adjacent tubes were cut off with a graphics editing software (Adobe Photoshop, Adobe Systems, USA). Afterwards the dry patches were marked with an image processing software (ImageJ, National Institutes of Health, USA) and the percentages of the wet surface area were calculated. The wetting tests were performed without inspection glasses at ambient pressure and temperature which was 27-34° C.

The test conditions and the test results of wetting behavior of different tube materials with different surfactants S are presented in Table 5.

TABLE 5

The results of wetting test on different tube materials

| Exp. No. | Nonionic Surfactant S | Concentration (ppm) | Tube material | Critical wetting rate* (kg/(s m)) |
|---|---|---|---|---|
| V.1 | Without nonionic surfactant S | — | AlMg2.5 | 0.050 |
| V.2 | Nonionic Surfactant 3 | 1 | AlMg2.5 | 0.040 |
| V.3 | Nonionic Surfactant 7 | 1 | AlMg2.5 | 0.025 |
| V.4 | Nonionic Surfactant 6 | 1 | AlMg2.5 | 0.100 |
| V.5 | Without nonionic surfactant S | — | CuNi 90/10 | 0.165 |
| V.6 | Nonionic Surfactant 3 | 1 | CuNi 90/10 | 0.120 |
| V.7 | Nonionic Surfactant 7 | 1 | CuNi 90/10 | 0.070 |
| V.8 | Nonionic Surfactant 7 | 2.5 | CuNi 90/10 | 0.080 |
| V.9 | Nonionic Surfactant 7 | 100 | CuNi 90/10 | 0.080 |
| V.10 | Nonionic Surfactant 6 | 1 | CuNi 90/10 | 0.040 |
| V.11 | Nonionic Surfactant 6:Nonionic Surfactant 12 (9:1) | 1 | CuNi 90/10 | 0.070 |
| V.12 | Nonionic Surfactant 6:Nonionic Surfactant 12 (9:1) | 1.11 | CuNi 90/10 | 0.060 |
| V.13 | Without nonionic surfactant S | — | CuNi 90/10-PT | 0.120 |
| V.14 | Nonionic Surfactant 7 | 1 | CuNi 90/10-PT | 0.052 |
| V.15 | Without nonionic surfactant S | — | Al brass | 0.032 |
| V.16 | Nonionic Surfactant 3 | 1 | Al brass | 0.020 |
| V.17 | Nonionic Surfactant 7 | 1 | Al brass | 0.020 |
| V.18 | Nonionic Surfactant 6:Nonionic Surfactant 12 (9:1) | 1.11 | Al brass | 0.020 |

*wetting rate is defined as the falling film mass flow rate on one side or on both sides of a horizontal tube per unit tube length. Herein, the wetting rate is expressed as the mass flow rate on both sides of a horizontal tube per unit tube length. The critical wetting rate is wetting rate necessary to reach fully wetted conditions on the tube surface.

VI. Scaling Experiments

All scale formation experiments were performed with 240 liters of artificial seawater with a salinity of 65 g/kg prepared according to the procedure given in section II of the experimental part for a test period of 50 hours. The experiments with 240 liters of test solution and a test period of 50 hours were found to be favorable because the period is long enough to find differences in scale formation and supersaturation levels are still high enough. The scaling experiments were performed at an evaporation temperature ($t_{EV}$)=65° C. which represents the current top brine temperature in MED plants. Furthermore, in order to consider a possible extension of the operating range of multiple-effect distillers towards higher top brine temperatures, experiments were performed at an evaporation temperature ($t_{EV}$)=75° C. exceeding the top brine temperature currently used in industrial MED distillers. For all experiments, the difference between the condensation temperature $t_{CO}$ inside the tubes and the evaporation temperature $t_{EV}$ outside the tubes was $t_{CO}-t_{EV}$=5° C.

The crystalline scale layers formed on the outside of the tubes of the evaporator were characterized by various methods to obtain chemical, structural, and quantitative information. The scale formed on the fifth tube from the top of the tube bank was analysed using scanning electron microscopy (SEM) in combination with energy dispersive X-ray spectroscopy (EDXS) and wide angle X-ray diffraction (XRD) to provide qualitative information on structural and chemical characteristics/properties of the scale, especially about composition, crystal structure, crystal size and orientation, and crystal perfection. The amounts of calcium and magnesium in the scale were detected by inductively coupled plasma atomic emission spectroscopy (ICP-AES). To this end, the scale of the fourth tube was dissolved in a hot solution of acetic acid and the concentrations of $Ca^{2+}$ and $Mg^{2+}$ ions in the solution were measured using ICP-AES. Based on the concentration of $Ca^{2+}$ and $Mg^{2+}$, the scale contents were calculated and presented as masses of Ca and Mg per total tube area (g/m$^2$). Additionally, the scale thickness was determined on the outside of the third tube. It was measured 10 times each at 4 different positions around the tube and at 9 different positions along the tube with a gauge (MiniTest 2100, ElektroPhysik, Germany) designed for non-destructive and precise coating thickness measurement.

The test conditions and the test results of scaling experiments are presented in Table 6. The SEM images of the tube surface are presented in FIG. 3-6.

Figure 3:
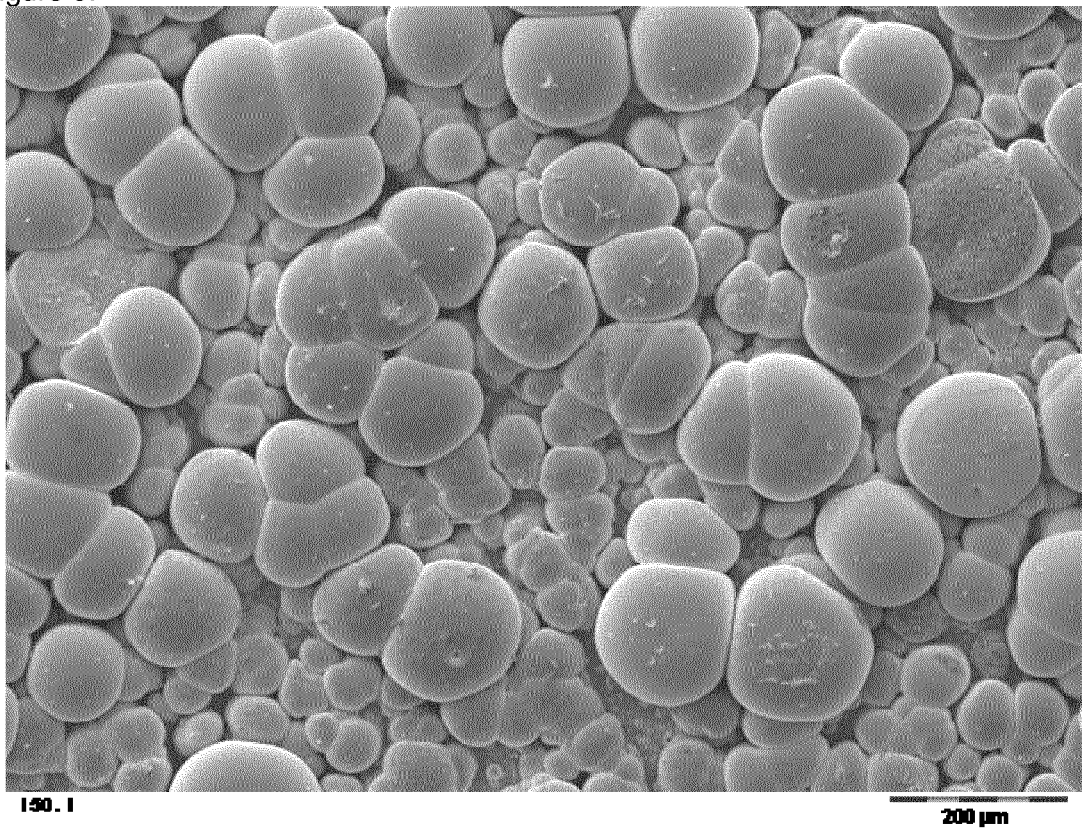
FIG. 3, SEM image of scale formed on AlMg2.5 tube surface with wetting rate=0.02 kg/(s m) without non-ionic surfactant S and polymer A.
Figure 4:
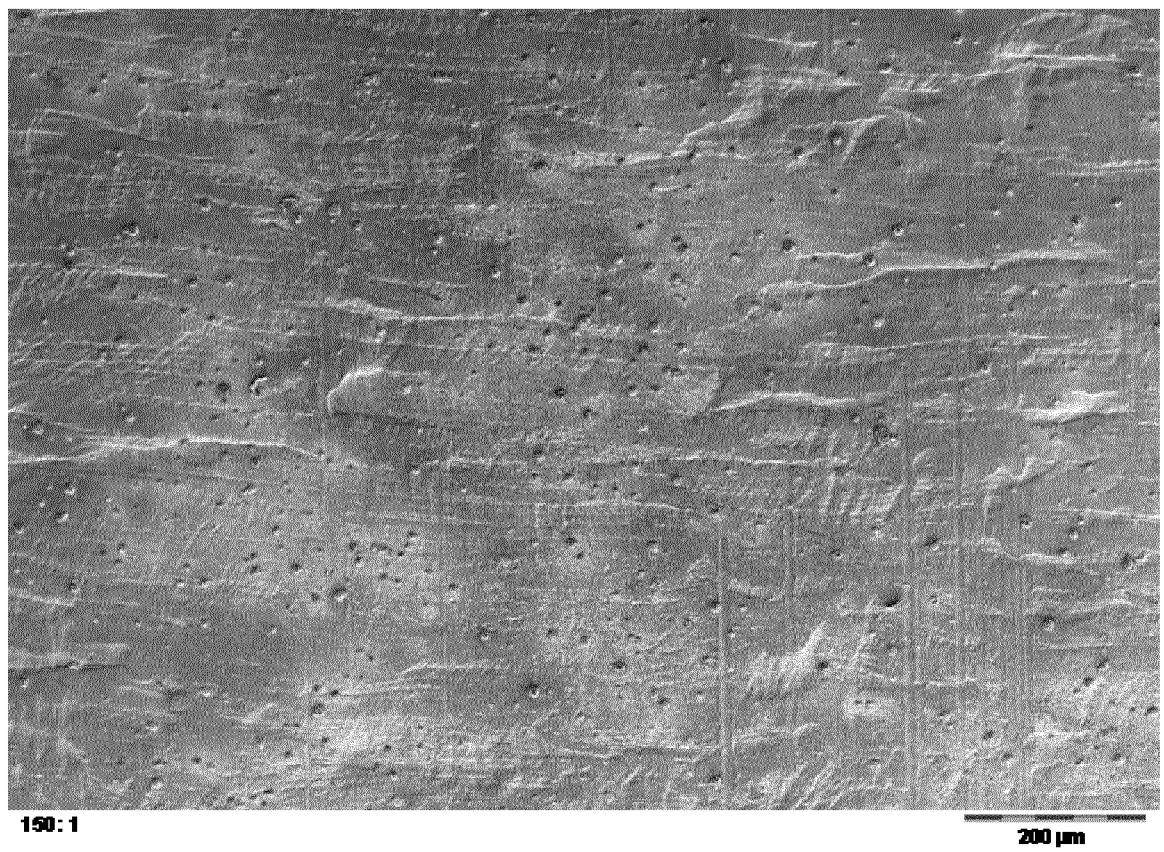
FIG. 4, SEM image of clean AlMg2.5 tube surface with wetting rate=0.02 kg/(s m), Nonionic Surfactant 7 (2.5 ppm) and Antiscalant 1 (4 ppm).

FIG. 3: SEM image of scale formed on AlMg2.5 tube surface with wetting rate=0.02 kg/(s m) without nonionic surfactant S and polymer A FIG. 4: SEM image of clean AlMg2.5 tube surface with wetting rate=0.02 kg/(s m), Nonionic Surfactant 7 (2.5 ppm) and Antiscalant 1 (4 ppm)

Figure 5:
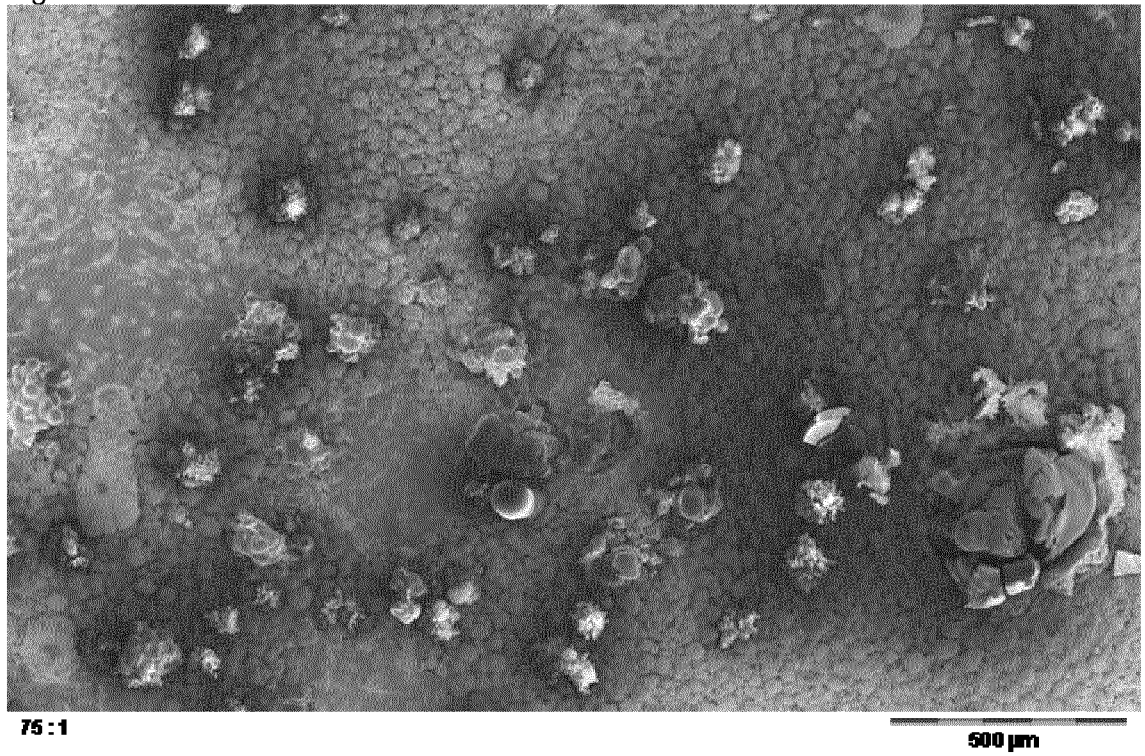
FIG. 5, SEM image of scale formed on AlMg2.5 tube surface with wetting rate=0.04 kg/(s m) without non-ionic surfactant S and antiscalant.
Figure 6:
FIG. 6, SEM image of clean AlMg2.5 tube surface with wetting rate=0.04 kg/(s m), Nonionic Surfactant 7 (2.5 ppm) and Antiscalant 1 (4 ppm).

FIG. 5: SEM image of scale formed on AlMg2.5 tube surface with wetting rate=0.04 kg/(s m) without nonionic surfactant S and antiscalant FIG. 6: SEM image of clean AlMg2.5 tube surface with wetting rate=0.04 kg/(s m), Nonionic Surfactant 7 (2.5 ppm) and Antiscalant 1 (4 ppm)

TABLE 6

| No. | Tube material | $t_{EV}/t_{CO}$ (° C.) | Γ (Kg/(s m)) | Nonionic Surfactant S (ppm) | Antiscalant (ppm) | Ca scale content (g/m$^2$) | Mg scale content (g/m$^2$) | Scale thickness (μm) | Film breakdown |
|---|---|---|---|---|---|---|---|---|---|
| VI.1 | AlMg2.5 | 65/70 | 0.02 | w/o | w/o | 3.97 | 0.13 | 7.1 | Yes |
| VI.2 | AlMg2.5 | 65/70 | 0.02 | w/o | Antiscalant 1 (4 ppm) | 1.25 | 0.13 | 9.2 | Yes |
| VI.3 | AlMg2.5 | 65/70 | 0.02 | Nonionic Surfactant 7 (2.5 ppm) | w/o | 0.38 | 0.01 | NA | No |
| VI.4 | AlMg2.5 | 65/70 | 0.02 | Nonionic Surfactant 7 (2.5 ppm) | Antiscalant 1 (4 ppm) | 0.04 | 0.00 | NA | No |
| VI.5 | AlMg2.5 | 65/70 | 0.04 | w/o | w/o | 10.73 | 0.26 | — | No |
| VI.6 | AlMg2.5 | 65/70 | 0.04 | w/o | Antiscalant 1 (4 ppm) | 0.06 | 0.04 | — | No |
| VI.7 | AlMg2.5 | 65/70 | 0.04 | Nonionic Surfactant 7 (2.5 ppm) | w/o | 8.38 | 0.29 | — | No |
| VI.8 | AlMg2.5 | 65/70 | 0.04 | Nonionic Surfactant 7 (2.5 ppm) | Antiscalant 1 (4 ppm) | 0.03 | 0.00 | — | No |
| VI.9 | CuNi 90/10 | 75/80 | 0.02 | w/o | w/o | 44.1 | 0.22 | 44.7 | Yes |
| VI.10 | CuNi 90/10 | 75/80 | 0.02 | Nonionic Surfactant 7 (2.5 ppm) | w/o | 24.99 | 0.41 | 49.2 | No |
| VI.11 | CuNi 90/10 | 75/80 | 0.02 | Nonionic Surfactant 6 (2.5 ppm) & Nonionic Surfactant 12 (0.27 ppm) | w/o | 25.73 | 0.41 | 50.2 | No |
| VI.12 | CuNi 90/10-PT | 75/80 | 0.04 | w/o | w/o | 5.6 | 0.16 | 1 | No |
| VI.13 | CuNi 90/10-PT | 75/80 | 0.04 | Nonionic Surfactant 7 (2.5 ppm) | w/o | 3.1 | 0.16 | 7.6 | No |
| VI.14 | Al brass | 65/70 | 0.02 | w/o | w/o | 30.9 | 0.16 | 30 | Yes |
| VI.15 | Al brass | 65/70 | 0.02 | w/o | Antiscalant 1 (4 ppm) | 0.04 | 0.07 | NA | No |
| VI.16 | Al brass | 65/70 | 0.02 | Nonionic Surfactant 7 (2.5 ppm) | w/o | 1.91 | 0.06 | NA | No |
| VI.17 | Al brass | 65/70 | 0.02 | Nonionic Surfactant 7 (2.5 ppm) | Antiscalant 1 (4 ppm) | 0.01 | 0.06 | NA | No |
| VI.18 | AlMg2.5 | 65/70 | 0.02 | Nonionic Surfactant 7 (1.5 ppm) | Antiscalant 1 (3 ppm) | 0.04 | 0.00 | NA | No |
| VI.19 | AlMg2.5 | 75/80 | 0.02 | Nonionic Surfactant 7 (1.5 ppm) | Antiscalant 1 (4 ppm) | 0.37 | 0.09 | NA | No |
| VI.20 | Al brass | 65/70 | 0.02 | Nonionic Surfactant 7 (1.5 ppm) | Antiscalant 1 (3 ppm) | 0.1 | 0.03 | NA | No |
| VI.21 | Al brass | 75/80 | 0.02 | Nonionic Surfactant 7 (1.5 ppm) | Antiscalant 1 (4 ppm) | 0.03 | 0.07 | NA | No |

Γ = wetting rate;
$t_{EV}$ = Evaporation temperature;
$t_{CO}$ = Condensation temperature

The invention claimed is:

1. A process for separating water from a mixture of water with at least one other component, the process comprising: providing a feed material comprising water and at least one nonionic surfactant in an amount of 0.1 to 1000 ppm by weight based on the feed material, and carrying out distillation of the feed material with a falling film evaporator, wherein the at least one nonionic surfactant is a polyalkylene oxide (PAO), wherein said PAO comprises a copolymer of at least two different types of alkylene oxides, and wherein said PAO is optionally functionalized at its terminal hydroxyl (OH) positions.

2. The process according to claim 1, wherein the distillation is carried out as a multieffect distillation.

3. The process according to claim 1, wherein the feed material further comprises at least one polymer A that is a polymer of at least one ethylenically unsaturated mono carboxylic acid and/or at least one ethylenically unsaturated dicarboxylic acid in an amount of 0.1 to 1000 ppm by weight based on the feed material.

4. The process according to claim 1, wherein the feed material further comprises at least one polymer that is a block copolymer comprising at least one polyolefinic block and at least one polyalkylene oxide block in an amount of 0.01 to 100 ppm by weight based on the feed material.

5. The process according to claim 1, wherein the feed material further comprises a nonionic surfactant selected from the group consisting of an alkoxylate of a linear or branched $C_4$-$C_{26}$ alcohol and a block copolymer comprising blocks of polyethyleneoxide and polypropylene oxide.

6. The process according to claim 1, wherein the nonionic surfactant has a molar mass of from 500 to 6000 g/mol.

7. The process according to claim 1, wherein said nonionic surfactant has an ability to reduce a contact angle of water on a surface of a tube material by 1 to 40 degrees.

8. The process according to claim 7, wherein the process is carried out as a multi effect distillation and wherein the tube material is selected from the group consisting of aluminum brass, titanium, stainless steel, an alloy of copper/nickel, an alloy of aluminum/magnesium, a metal comprising a ceramic coating, and a polymer composite comprising graphite and at least one organic polymer.

9. The process according to claim 1, wherein the feed material is a solution of sugar, salt water, brackish water or brine obtained in at least one waste water treatment operation.

10. The process according to claim 1, wherein the nonionic surfactant is a polyalkyleneoxide which has a structure PEO-PPO-PEO, PPO-PEO-PPO, PEO-PBO-PEO or PEO-pTHF-PEO.

* * * * *